(12) United States Patent
Johnson et al.

(10) Patent No.: US 10,649,928 B1
(45) Date of Patent: *May 12, 2020

(54) BROADCASTING READS TO MULTIPLE MODULES

(71) Applicant: Amazon Technologies, Inc., Seattle, WA (US)

(72) Inventors: Robert Michael Johnson, Austin, TX (US); Asif Khan, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,339

(22) Filed: Jan. 14, 2019

Related U.S. Application Data

(63) Continuation of application No. 14/983,154, filed on Dec. 29, 2015, now Pat. No. 10,180,919.

(51) Int. Cl.
*G06F 13/16* (2006.01)
*G06F 13/40* (2006.01)

(52) U.S. Cl.
CPC ...... *G06F 13/1668* (2013.01); *G06F 13/1605* (2013.01); *G06F 13/4068* (2013.01)

(58) Field of Classification Search
CPC ............ G06F 13/1668; G06F 13/1605; G06F 13/4068
See application file for complete search history.

(56) References Cited

U.S. PATENT DOCUMENTS

| | | | | |
|---|---|---|---|---|
| 5,226,039 A | * | 7/1993 | Frank | G06F 9/383 370/405 |
| 6,018,778 A | * | 1/2000 | Stolowitz | G06F 3/061 710/52 |
| 10,180,919 B1 | * | 1/2019 | Johnson | G06F 13/1668 |
| 2011/0110515 A1 | | 5/2011 | Tidwell et al. | |
| 2014/0297963 A1 | * | 10/2014 | Fukuda | G06F 12/0808 711/135 |
| 2014/0317322 A1 | | 10/2014 | Rohatschek et al. | |

OTHER PUBLICATIONS

U.S. Appl. No. 14/983,145, "Final Office Action", dated Jun. 14, 2018, 15 Pages.

(Continued)

*Primary Examiner* — Henry Tsai
*Assistant Examiner* — John B Roche
(74) *Attorney, Agent, or Firm* — Kilpatrick Townsend & Stockton LLP

(57) ABSTRACT

A bus controller is configured to transmit a broadcast read request on at least one bus. The broadcast read request includes an address. A first logic module determines that the broadcast read request is targeting the first logic module. The first logic module reads a first value from a first register included in the first logic module. The first register is specified by the address included in the broadcast read request. The first value is transmitted onto the at least one bus. A second logic module determines that the broadcast read request is targeting the second logic module. The second logic module reads a second value from a second register included in the second logic module. The second register is specified by the address included in the broadcast read request. The second value is transmitted onto the at least one bus.

20 Claims, 10 Drawing Sheets

(56) References Cited

OTHER PUBLICATIONS

U.S. Appl. No. 14/983,145, "Non-Final Office Action", dated Nov. 16, 2017, 26 pages.
U.S. Appl. No. 14/983,145, "Notice of Allowance", dated Sep. 21, 2018, 11 pages.
U.S. Appl. No. 14/983,145, filed Dec. 29, 2015, titled: Broadcasting Writes to Multiple Modules.
U.S. Appl. No. 14/983,154, "Corrected Notice of Allowability", dated Oct. 4, 2018, 4 pages.
U.S. Appl. No. 14/983,154, "Final Office Action", dated Jun. 14, 2018, 15 pages.
U.S. Appl. No. 14/983,154, "Non-Final Office Action", dated Nov. 3, 2017, 26 pages.
U.S. Appl. No. 14/983,154, "Notice of Allowance", dated Sep. 18, 2018, 11 pages.
U.S. Appl. No. 14/983,154, filed Dec. 29, 2015, titled: Broadcasting Reads to Multiple Modules.

\* cited by examiner

BROADCASTING READS TO MULTIPLE MODULES

CROSS-REFERENCE TO RELATED APPLICATIONS

This application is a continuation of U.S. patent application Ser. No. 14/983,154, filed Dec. 29, 2015, entitled "Broadcasting Reads to Multiple Modules", the content of which is incorporated herein by reference in its entirety.

BACKGROUND

Integrated circuit systems, such as Application Specific Integrated Circuit (ASICs), Field Programmable Gate Array (FPGAs), and System-on-a-Chip (SoC) designs, typically have a method for reading and writing registers in individual modules in the circuit. For example, the modules in the circuit may have configuration registers that are written during configuration of the circuit, and/or may have statistics registers that may be read during operation of the circuit. Typically, integrated circuit design includes a bus for writing and reading these registers. A processor or processor core or host device may have access to this bus, possibly through a bus controller, and may drive transactions onto the bus.

BRIEF DESCRIPTION OF THE DRAWINGS

Various embodiments in accordance with the present disclosure will be described with reference to the drawings, in which.

DETAILED DESCRIPTION

Figure 1:
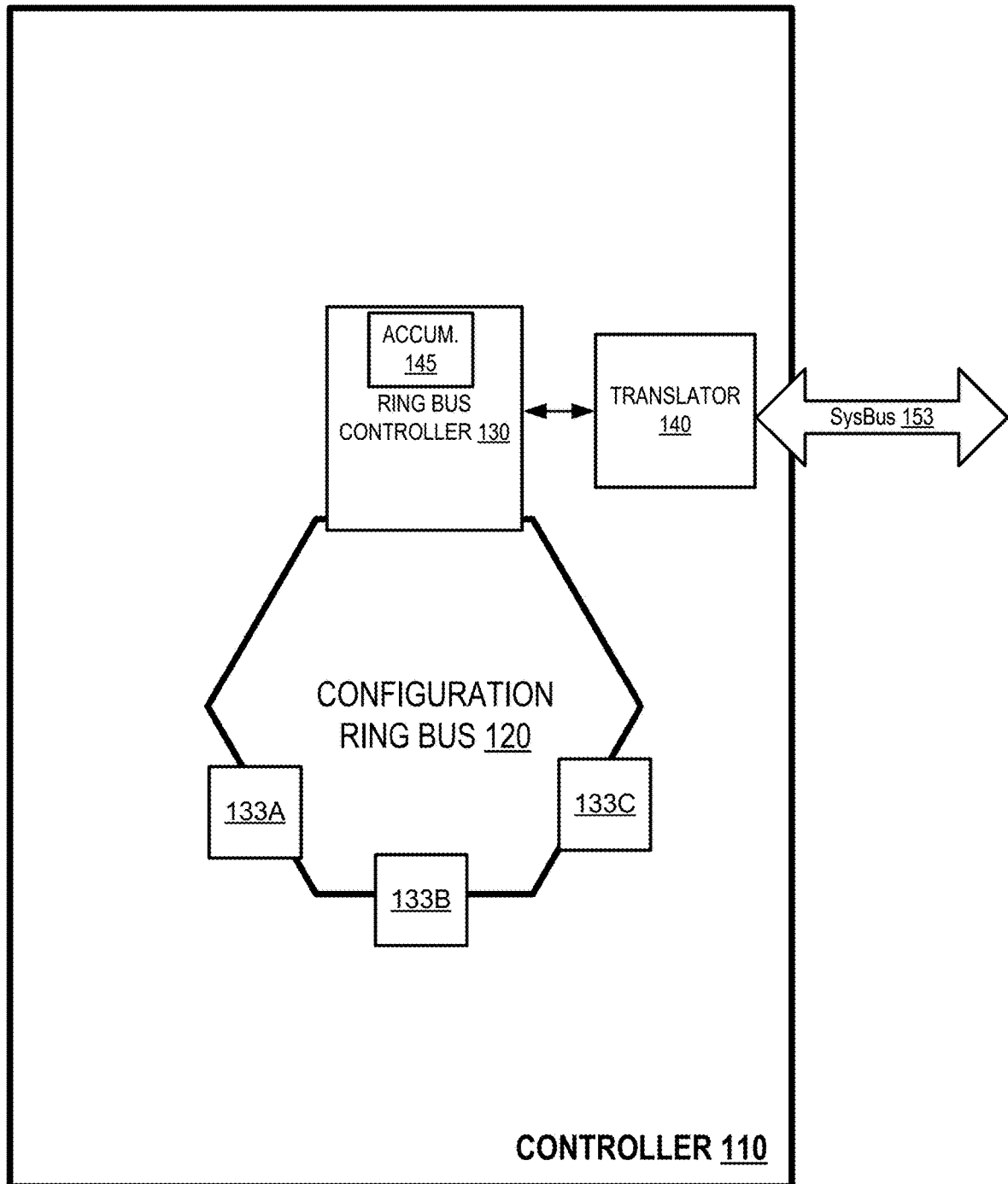
FIG. 1 illustrates an example controller having a ring bus controller and a ring bus.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Writing data to multiple registers and reading data from multiple registers is a typical task for processors, multi-core processors, and some Application-Specific Integrated Circuits ("ASIC"). In one context, processors or ASICs are used in network switches to route network data and for connecting devices of a computer network. Network switches may include one or more network controllers for routing the network data. Servers utilize network switches to serve webpage content and/or execute aspects of one or more applications for a client device connected to the server, for example.

Initially, network controllers may be configured by writing configuration registers with the appropriate data to carry out the desired function of the server. Additionally, the configuration registers may be periodically updated to implement new policies or support new functions. Network switches often times have multiple ingress and egress pipelines in parallel for simultaneous routing of multiple data packets. Each pipeline has its own blocks that operate on the data packets received by the specific pipeline. If there are eight pipelines, for example, there may be eight blocks that perform the same function, one for each pipeline.

In one example, each of the eight blocks includes a logic module and each of the eight instances of the logic module includes an Access Control List ("ACL"). The ACL may have one or more Access Control Entries ("ACE") that controls access to certain Internet Protocol (IP) addresses on the network. The ACL in all eight blocks may need to be updated or modified with one or more different ACEs, based on new information. Conventionally, each ACL is updated by individually writing the updated ACE(s) to each of the identical logic modules. However, this approach is potentially time consuming and uses significant processing resources to facilitate writing the updated ACE(s) to each of the identical ACLs in the modules.

In some situations, configuration registers from different logic modules are read to gather, for example, statistics data from each pipeline. Here again, each pipeline may have logic modules that perform the same function. In one example, a statistic associated with a pipeline may be stored in a register of the logic module. The statistic may be the number of packets that have been dropped or forwarded, for example. Conventionally, each of these statistics is individually read from each of the logic modules. This approach is also potentially time consuming and may use significant processing resources to individually read each statistic from the configuration registers of each logic module that performs the same function.

Devices and techniques described herein include broadcasting a write request on at least one bus. In one embodiment, a write request may be broadcast to multiple logic modules on a plurality of corresponding busses. In one embodiment, a write request may be broadcast to logic modules on a ring bus. Multiple logic modules may be configured as nodes on the ring bus and each logic module may receive the broadcast write request. If a given logic module determines that the broadcast write request is addressed to the given logic module, it will store a value (or more than one value) from the broadcast write request in one or more registers of the given logic module. The addresses of the one or more registers may be specified in the broadcast write request. Hence, a broadcast write request may effect storing a value into the registers of multiple logic modules. By using a broadcast write request, fewer processing resources may be used and the time required to populate the registers of multiple logic modules may be reduced.

Devices and techniques described herein also include broadcasting a read request on at least one bus. In one embodiment, a read request may be broadcast to multiple logic modules on a plurality of corresponding busses. In one embodiment, a read request may be broadcast to logic modules on a ring bus. Multiple logic modules may be configured as nodes on the ring bus and each logic module may receive the broadcast read request. If a given logic module determines that the broadcast read request is addressed to the given logic module, it will read a value (or more than one value) from one or more registers of the given logic module. The addresses of the one or more registers to be read may be specified in the broadcast read request. Hence, a broadcast read request may effect reading a value from the registers of multiple logic modules. By using a broadcast read request, fewer processing resources may be used and the time required to read the registers of multiple logic modules may be reduced.

FIG. 1 illustrates an example controller 110, a translator 140, an accumulator 145, a ring bus controller 130, a ring bus 120, and logic modules 133A, 133B, and 133C (collectively referred to herein as logic modules 133). Although not illustrated here, additional logic modules may be connected to the ring bus 120. In one embodiment, the controller 110 is an ASIC. In one embodiment, controller 110 is a network controller that includes an ethernet port array interface for sending and receiving data signals from ethernet connections that send and receive network data. For example, the ethernet port array may include 1 to 128 individual ethernet connections. The network data received by the ethernet port array may be routed by the controller 110. The logic modules 133 that are connected to the ring bus 120 may influence the routing of the network data.

The ring bus controller 130 is configured to receive read and write requests from the system bus 153, including broadcast requests (e.g. broadcast read request and/or a broadcast write request). In one implementation, the system bus 153 is a Peripheral Component Interconnect (PCI) bus. The translator 140 may translate the broadcast request from the PCI protocol to a protocol implemented by the ring bus controller 130. Accumulator 145 may optionally be coupled to the ring bus controller 130 or be included in ring bus controller 130, as illustrated. As will be explained in more detail below, the accumulator 145 may store read responses received by the ring bus controller 130.

The ring bus controller 130 controls the ring bus 120. In one embodiment, each logic module 133A-133C on the ring bus 120 is a target for the ring bus controller 130, which is the master. The ring bus 120 connects logic modules 133 and logic modules 133 are configured as nodes on the ring bus 120. In this example, the logic modules 133 are multiple instances of the same logical operation. For example, the logic modules 133 may be three instances of an ingress pipeline for routing packets. Although only three logic modules (133A-133C) are illustrated in FIG. 1, many more (e.g. hundreds) of logic modules may be connected to the ring bus 120. Each of these additional logic modules may implement different logical operations than are implemented by the illustrated logic modules 133. Each logic module 133 includes a plurality of registers. In one embodiment, the plurality of registers may include Control and Status Registers ("CSRs") for routing network data.

To write to the registers of multiple logic modules, the ring bus controller 130 may transmit a broadcast write request to the ring bus 120 to write a value. For example, the broadcast write request may write a value to an Access Control Entry of an Access Control List stored in the registers of the logic module 133. As another example, the broadcast write request may write values to entries in Layer 2, Layer 3, and/or Multi-Layer Protocol (MPLS) routing tables. As another example the broadcast write request may write values to configuration registers that control the operation of the logic modules 133. To read values (e.g. a particular network statistic) from the registers of multiple logic modules 133 on the ring bus 120, the ring bus controller 130 transmits a broadcast read request to the ring bus 120. Though not illustrated here, additional modules may be connected to the ring bus 120 that are not targeted by a broadcast write or read transaction. These additional modules may receive the broadcast transaction and not act upon on it, instead only passing the transaction on to the next module on the ring bus 120.

For broadcast writing purposes, the ring bus controller 130 may send a broadcast write request that targets multiple logic modules 133. The broadcast write request "targets" a logic module when a broadcast indicator is included in the broadcast write request. In one embodiment, the broadcast indicator is a broadcast address included in the broadcast write request. The broadcast write request may include a broadcast address, a register address, and a value. The broadcast address determines which of the logic modules are targeted, in this case. The broadcast address may be determined from the register address, in some embodiments. The register address determines which of the configuration registers of the logic modules that the value is to be written to. In some implementations, the broadcast write request may include one address, where one component of the address indicates a broadcast address and another component indicates a register address. For example, in one implementation, the upper sixteen bits of the one address may represent the broadcast address and the remaining bits represent the register address. In one embodiment, the broadcast indicator is included in a command field of the broadcast write request. In these embodiments, a logic module may accept and process a broadcast write request that it would not otherwise have accepted (for example, because the write address was not within the address range of the logic module). In these embodiments, once processed, the write address may map to a register in the logic module.

For broadcast reading purposes, the ring bus controller 130 may send a broadcast read request that targets multiple logic modules 133. The broadcast read request "targets" a logic module when a broadcast indicator is included in the broadcast read request. In one embodiment the broadcast read request includes a broadcast address and a register address. The broadcast address determines which of the logic modules are targeted, in this case. The broadcast address may be determined from the register address, in some embodiments. The register address determines which of the configuration registers of the logic modules that should be read. In one embodiment, the broadcast indicator is included in a command field of the broadcast read request. In these embodiments, a logic module may accept and process a broadcast read address that it would not otherwise have accepted (for example, because the read address was not within the address range of the logic module). In these embodiments, once processed, the read address may map to a register in the logic module.

In addition to broadcast write requests and broadcast read requests that target multiple logic modules 133, the ring bus controller 130 may also send single read requests and single write requests that read and write to one or more registers in just one logic module 133. In one embodiment, the category of request (e.g. broadcast write request, broadcast read request, single write request, or single read request) is specified in a command field of the request.

The ring bus 120 connects the logic modules 133 and the ring bus controller 130. Data lines (e.g. 32 parallel data lines), a bus valid line, and a reset line may be included in one embodiment of the ring bus 120. Data to be written and/or data read from configuration registers sent to the ring bus controller 130 may be transferred using data lines of the ring bus 120. Request types (e.g. broadcast read, broadcast write, single read, single write) register addresses, broadcast addresses, and a "count" field may also be transferred using the data lines of the ring bus 120 that run between the logic modules 133. Signals on the various lines of the data bus may be received by an input stage of the logic module 133 and passed to the next downstream logic module 133 by an output stage of the logic module 133.

Each logic module 133 is configured to: (1) receive the broadcast request (whether a broadcast read request or a broadcast write request); (2) look at the broadcast address to see whether the logic module was targeted; and (3) pass the broadcast request downstream to the next logic module. In the illustrated example, logic module 133A receives the broadcast request from the ring bus controller 130 and passes the broadcast request downstream to logic module 133B. Logic module 133B receives the broadcast request from logic module 133A and passes the broadcast request downstream to logic module 133C. Finally, logic module 133C receives the broadcast request from logic module 133B and passes the broadcast request downstream to the ring bus controller 130. Hence, logic modules 133 are arranged sequentially on the ring bus 120, and each logic module 133 passes the broadcast request downstream to the next logic module 133 until the broadcast request is received back at the ring bus controller 130.

In one embodiment, each logic module 133 is configured with a broadcast address range. Each logic module 133 may determine whether the broadcast address included in the broadcast request is within the broadcast address range of the receiving logic module 133. If the broadcast address is within the broadcast address range of the receiving logic module 133, the receiving logic module 133 knows that it is being targeted.

Figure 2:
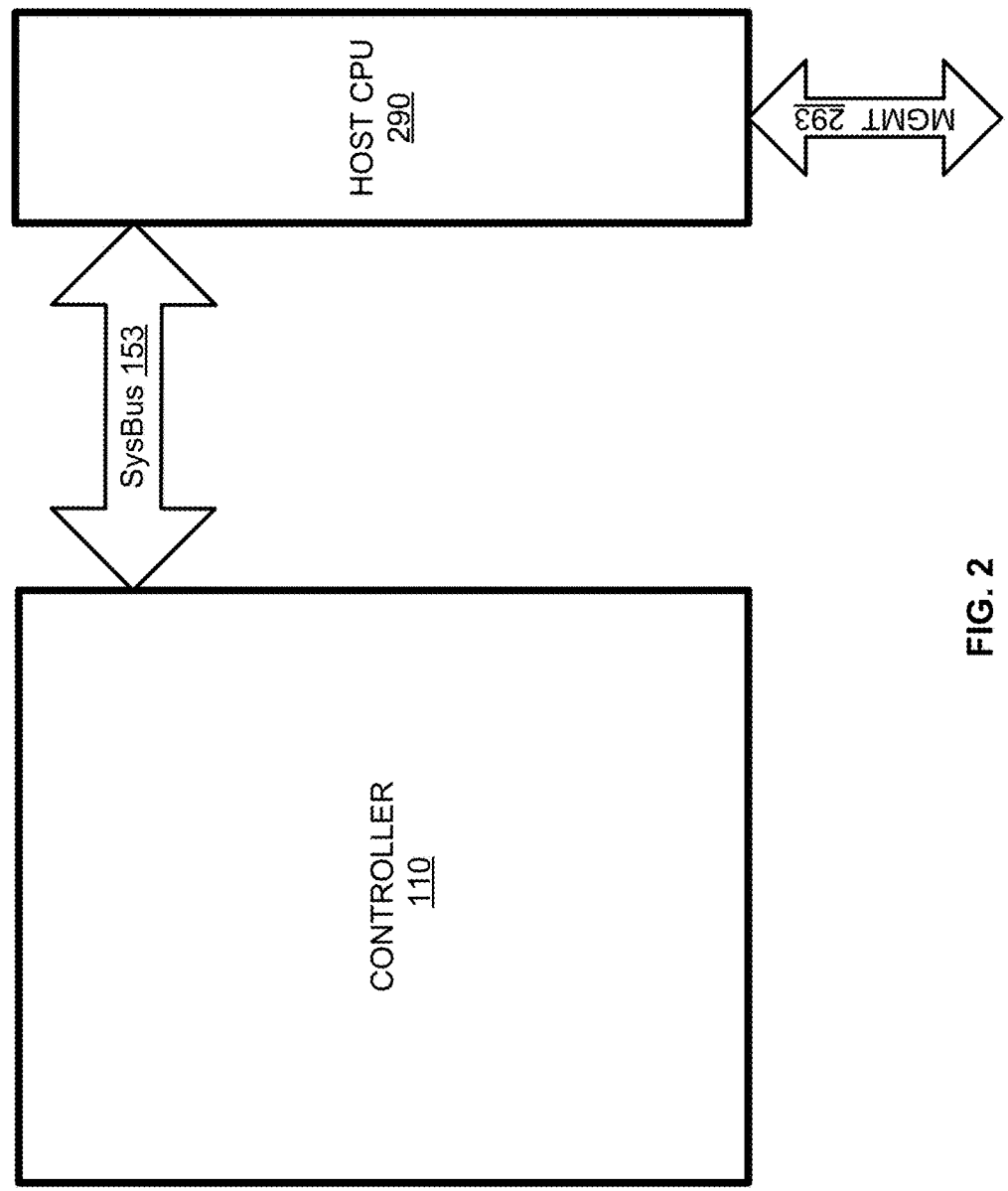
FIG. 2 illustrates a controller coupled to a host CPU.

FIG. 2 illustrates an example of a server 200 that includes a controller 110 coupled to host Central Processing Unit (CPU) 290 via system bus 153. In the illustrated example, the Host CPU 290 is an example of a requestor that can send the broadcast read requests and broadcast write requests to the controller 110. Host CPU 290 may send the broadcast requests in response to receiving a management message over a management interface 293. When host CPU 290 sends a broadcast read request to the controller 110, the controller 110 may send back to host CPU 290 a response that includes the requested data from the controller. In one embodiment, host CPU 290 includes an ethernet port to receive one or more management messages from a remote computer. In one embodiment, host CPU 290 includes an ethernet port to receive one or more management messages from a remote computer linked to management interface 293. Host CPU 290 and the controller 110 may be included on a motherboard of a server. Alternatively or additionally, the host CPU 290 may be included in the same board and/or in the same chassis as the controller 110. In one embodiment, controller 110 may be included within the host CPU 290. Host CPU 290 may control status LEDs, power supply LEDs, and fan LEDs of the server. Host CPU 290 may also control fan operations in response to receiving temperature feedback from temperature sensors of the server.

Figure 3:
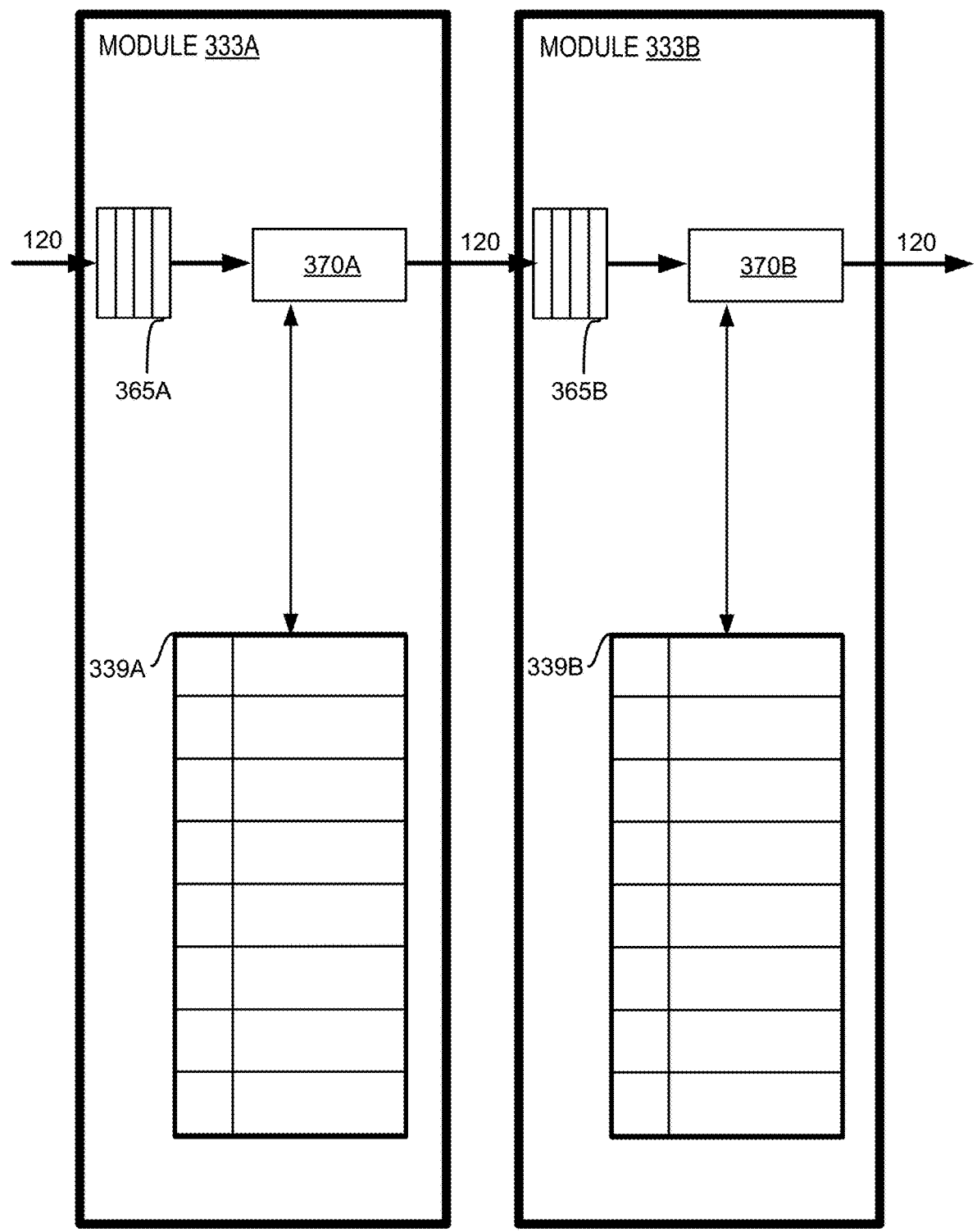
FIG. 3 illustrates example logic modules that are connected to a ring bus of a network controller.

FIG. 3 illustrates example logic modules 333A and 333B (collectively referred to herein as logic modules 333), which may implement the same logic operation, and may both be connected to the ring bus 120. In this example, each logic module 333 includes a buffer 365A, 365B (collectively referred to as a buffer 365), block logic 370A, 370B (collectively referred to as block logic 370), and a plurality of registers 339A, 339B (referred collectively as registers 339). In some implementations, the plurality of registers 339 may include entries in a memory, such as a Random-Access-Memory (RAM). In some implementations, the plurality of registers 339 may include registers arranged in a table. The logic modules 333 are coupled to the ring bus 120 and configured to receive the read and write requests from the ring bus 120. The read and write requests are generated by the ring bus controller (e.g. ring bus controller 130). In the example of FIG. 3, the buffer 365 is a four location buffer for storing received broadcast requests. In some implementations, the buffer 365 may have more or fewer entries. Other implementations may not include the buffer 365. Block logic 370 receives the read and write requests from the buffer 365. Block logic 370 may also determine whether the read and write request is a broadcast write request or a broadcast read request. In one embodiment, block logic 370A and 370B in logic modules 333A and 333B are instances of the same logical operation in that they perform identical operations, and are duplicated in order to perform the same operations on different streams of data.

For a broadcast write request, block logic 370 may determine whether the particular logic module 333 is targeted by the broadcast request. Specifically, the block logic 370 may determine whether the broadcast address in the broadcast write transaction is within the broadcast address range of the particular receiving logic module 333. For example, a particular logic module 333 may be configured to have a broadcast address range of between 0x1000 and 0x2000, and hence any broadcast address between 0x1000 and 0x2000 (e.g., 0x10AA) would "target" that particular logic module 333. If the logic module 333 is targeted by the broadcast write request, the block logic 370 writes the value included in the broadcast write request to an addressed register that is identified by the register address included in the broadcast write request. The addressed register is one of the registers 339 included in logic module 333. Block logic 370 also passes the broadcast write request downstream to the next logic module 333. In one embodiment, block logic 370 passes the broadcast write request downstream to the next logic module 333 in parallel with processing the broadcast write request. In another embodiment, the block logic 370 passes the broadcast write request downstream only after completing the request. In the illustrated embodiment, logic module 333A passes the broadcast write request downstream to logic module 333B.

In one embodiment, the broadcast write request includes a "count" field and block logic 370 will increment or decrement the count field to indicate that a targeted logic module received and successfully processed the broadcast write request. In one embodiment, the count field of the broadcast write request is populated with the number of targeted logic modules. Hence, the count field should be decremented to zero by the time the broadcast write request makes its way back to the ring bus controller 130. This allows the ring bus controller 130 to verify that each targeted logic module 133 received the broadcast write request. In one embodiment, the broadcast write request includes a bitmask field. The bitmask field may be have an integer number of bits that is the same as or great than the number of logic modules on the ring bus 120. Each logic module 133 may toggle one of the bits of the bitmask to indicate that the logic module has received the broadcast write request. For example, the third logic module on the ring bus 120 may toggle the third bit of the bitmask to indicate that the third logic module received the broadcast write request. The ring bus controller 130 may then analyze the returned bitmask field of the broadcast write request to determine which logic modules received the broadcast write request.

In addition to or instead of decrementing the "count" field of the broadcast write request, block logic 370 may generate a write response after writing the value to the addressed configuration register. Therefore, the ring bus controller 130 will receive a write response from each of the targeted logic modules to ensure that the value was written to the addressed register of each of the logic modules.

In one embodiment, the broadcast write request is a burst request. A burst broadcast write request includes a plurality of values to be written to the targeted logic modules 133. The logic modules 133 are configured to write the plurality of values included in the burst broadcast write request by writing each of the plurality of values to sequentially addressed registers, beginning with the register identified by the register address included in the burst broadcast write request. The plurality of values may be sent on data lines of the ring bus 120 over a plurality of cycles of the ring bus 120.

For broadcast read requests, block logic 370 may determine whether the particular logic module 333 is targeted by the broadcast request. Specifically, the block logic 370 may determine whether the broadcast address in the broadcast read transaction is within the broadcast address range of the particular receiving logic module 333. If the logic module 333 is targeted by the broadcast read request, the block logic 370 reads a value from an addressed register of the registers 339. The addressed register may be identified by the register address included in the broadcast read request. The addressed register is one of the registers 339 included in logic module 333. Block logic 370 may also pass the broadcast read request downstream to the next logic module 333. In one embodiment, block logic 370 may pass the broadcast read request downstream to the next logic module 333 in parallel with processing the broadcast read request. In another embodiment, the block logic 370 may pass the broadcast read request downstream only after completing the request. In the illustrated embodiment, logic module 333A passes the broadcast read request downstream to logic module 333B.

For broadcast read requests, block logic 370 may read the value from the addressed register and generate a read response that includes the value. The read response may then be transmitted back to the ring bus controller 130 by way of the ring bus 120. Therefore, the ring bus controller 130 will receive a read response from each of the targeted logic modules in response to transmitting the broadcast read request. In some implementations, when the ring bus controller 130 receives the read responses from each of the targeted logic modules, the ring bus controller 130 accumulates the values of the read responses. In one embodiment, the ring bus controller 130 stores the read responses in the accumulator 145, which is communicatively coupled to the ring bus controller 130. When all of the read responses have been received from the targeted logic modules, the ring bus controller 130 may transmit the accumulated values to the host CPU.

In one embodiment, ring bus controller 130 is configured to accumulate the values read from each of the logic modules by performing one or more logical operation (e.g. mathematical operation, selection operation, AND-ing, OR-ing, XOR-ing, and/or some combination of operations) on the values read from each of the logic module and including the resulting value in an accumulated response to CPU 290.

In one embodiment, the ring bus controller 130 is configured to accumulate the values read from each of the targeted logic modules 133 by appending the values into an accumulated response. The accumulated response can then be sent back to host CPU 290 in a single transmission over the bus 153. Without the accumulated response, each response from each logic module 333 may have to be sent to the host CPU in individual read responses. With the accumulated response, only one response need be sent. In some implementations, the ring bus controller 130 may be configured to send individual responses from the logic modules to the host CPU 290 instead of an accumulated response. In one embodiment, the ring bus controller 130 is configured to accumulate the values from each of the read responses into a sum by summing the values. The sum is then returned to host CPU 290 in the accumulated response.

In one embodiment, the broadcast read request includes a "count" field and block logic 370 will increment or decrement the count field to indicate that the targeted logic module received and successfully processed the broadcast read request. In one embodiment, the count field of the broadcast read request is populated with the number of target logic modules. Hence, the count field should be decremented to zero by the time the broadcast read request makes its way back to the ring bus controller 130. This allows the ring bus controller 130 to verify that each targeted logic module 133 received the broadcast read request.

In one embodiment, the broadcast read request is a burst request. When a logic module 133 is targeted by a burst broadcast read request, the targeted logic module 133 reads a plurality of values from sequentially addressed registers from the targeted logic module 133. The plurality of values may then be sent to ring bus controller 130 in one or more read responses via the ring bus 120.

Figure 4:
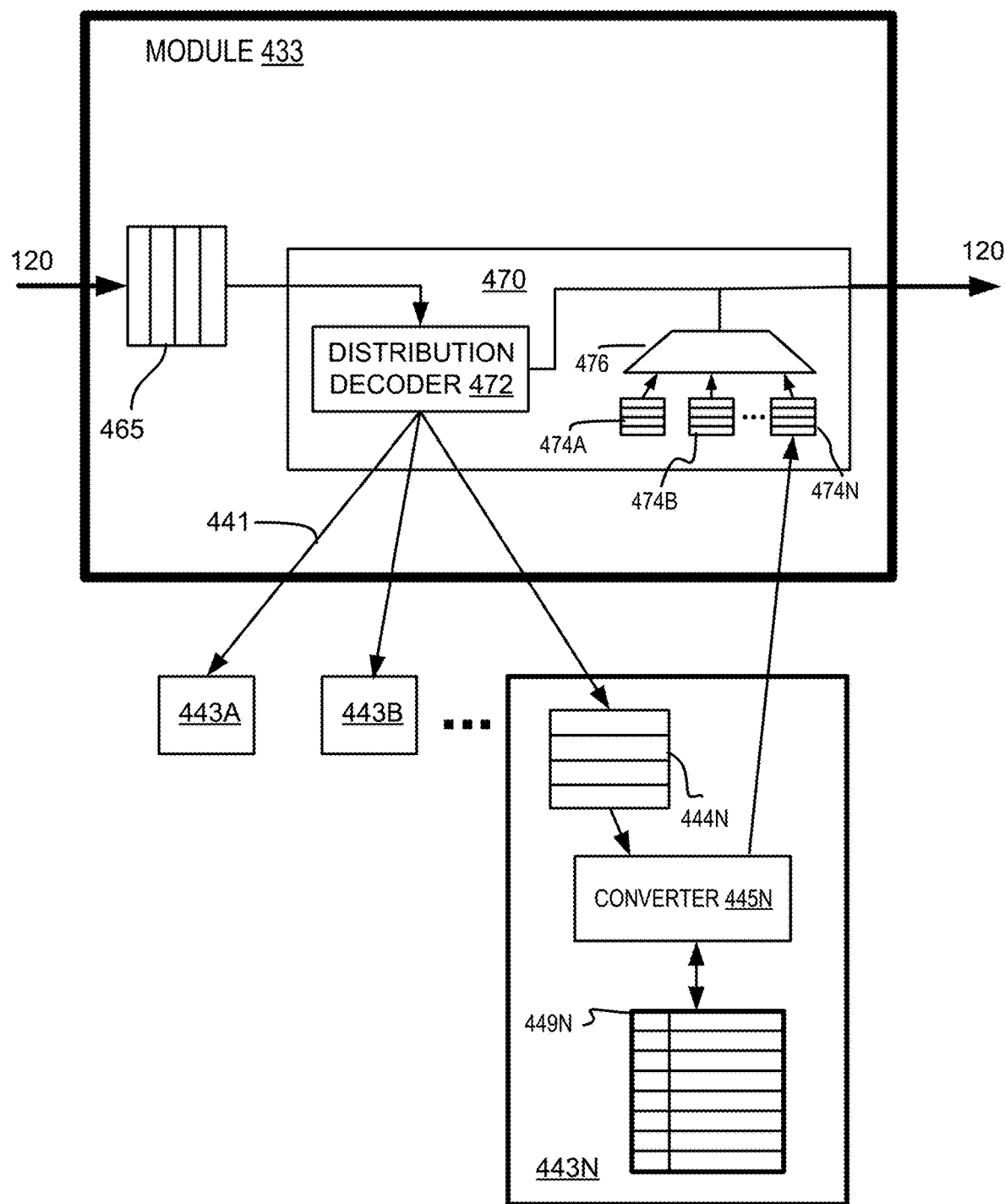
FIG. 4 illustrates an example major logic module and example sub-modules.

FIG. 4 illustrates an example of a block diagram schematic of a major logic module 433 that is configured to distribute broadcast requests to sub-modules 443A-443N (collectively referred to as sub-modules 443). The major module 433 includes a buffer 465 and logic 470. Logic 470 may include a distribution decoder block 472, a response mux 476, and response buffers 474A through 474N. In the example of FIG. 4, buffer 465 is a four location buffer for storing received broadcast requests transmitted on the ring bus 120. In various embodiments, the buffer 465 may include more or fewer buffers, or the logic 470 may not include the buffer 465.

In one implementation, the logic 470 may receive the broadcast request from the buffer 465 and may decode the broadcast request. If the broadcast request is targeted at any of sub-modules 443A-443N (the broadcast address is within the address range of the sub-modules), then the distribution decoder block 472 generates its own sub-requests and sends those sub-requests to sub-modules 443A-443N, where N is the number of sub-modules connected to distribution decoder block 472. The sub-requests may be write sub-requests or read sub-requests, depending on whether the broadcast request is a broadcast write request or a broadcast read request. Distribution decoder block 472 may also pass the broadcast request downstream to the next logic module (e.g. logic module 333 or 433) on the ring bus 120, either before or after processing the request.

Sub-module 443N is an example sub-module that includes an input buffer 444N, a converter 445N, and a plurality of registers 449N. Input buffer 444N receives the broadcast request from the distribution decoder block 472 via point-to-point connection 441. Point-to-point connection 441 may be a data bus.

If the sub-request is a write sub-request, the write sub-request may include a value and a register address of a register where the value is to be written. The value and the register address may have been included in the broadcast write request received by distribution decoder block 472. In the case of a write sub-request, the converter 445N writes the value to the register address found in the plurality of registers 449N. In some implementations, the converter 445N converts the write sub-request from input buffer 444N to be compatible with a Random-Access-Memory (RAM) interface, where the plurality of registers 449N are RAM, in one embodiment.

If the sub-request is a read sub-request, the read sub-request may include a register address of a register to be read. The register address may have been included in the broadcast read request received by the distribution decoder block 472. In some implementations, in the case of a read sub-request, the converter 445N reads a value at the register address of one of the registers 449N. In these implementations, the converter 445N may convert the read sub-request from input buffer 444N to be compatible with a RAM interface, where the plurality of registers 449N are RAM, in one embodiment. When the converter 445N receives the value from the addressed configuration register, the value is sent to response buffer 474N. Logic 470 then prepares a read response that includes the value, and transmits the read response onto the ring bus 120, at the appropriate time, using the response mux 476. The read response may be sent to the ring bus controller 130 for accumulation over ring bus 120. Sub-modules 443A and 443B may be similarly configured to send values to response buffers 474A and 474B for transmission onto the ring bus 120 at the appropriate time, using the response mux 476.

Figure 5:
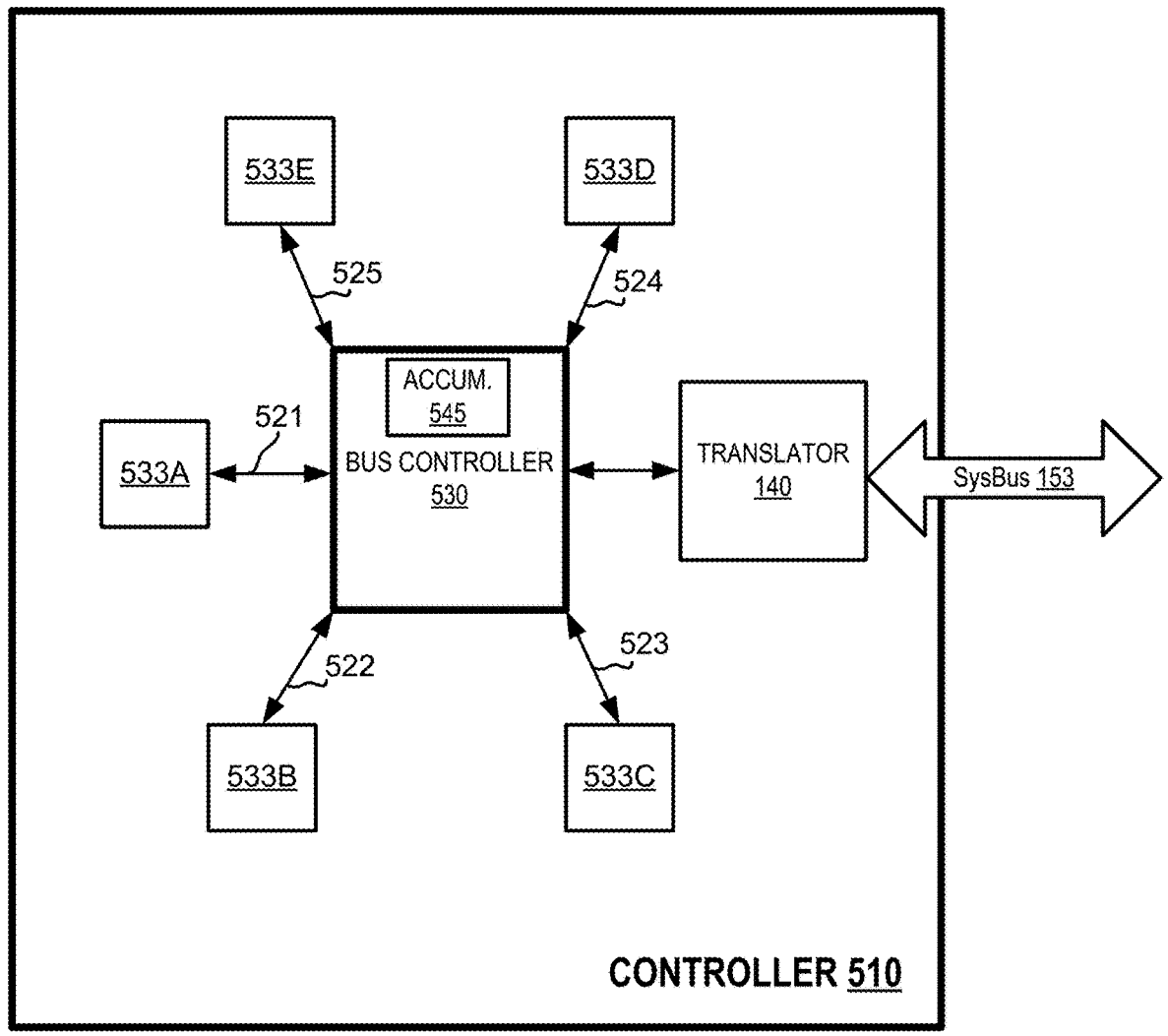
FIG. 5 illustrates logic modules coupled to an example bus controller.

FIG. 5 illustrates logic modules 533A-533E (collectively referred to as logic modules 533) coupled to an example bus controller 530 of a controller 510, in a configuration that may be called a star configuration. Bus controller 530 is configured to receive read and write requests from the system bus 153, including broadcast requests (e.g. broadcast read requests and/or a broadcast write requests). In one implementation, the system bus 153 is a Peripheral Component Interconnect (PCI) bus. In these implementations, the translator 140 may translate the broadcast request from the PCI protocol to a protocol implemented by the bus controller 530. Accumulator 545 is illustrated as included in bus controller 530. As will be explained in more detail below, the accumulator 545 may store read responses received by the bus controller 530.

In the illustrated example, a data bus is coupled between the bus controller 530 and each of the logic modules 533. For example, data bus 521 is coupled between logic module 533A and bus controller 530, data bus 522 is coupled between logic module 533B and bus controller 530, data bus 523 is coupled between logic module 533C and bus controller 530, data bus 524 is coupled between logic module 533D and bus controller 530, and data bus 525 is coupled between logic module 533E and bus controller 530. Thus, each of the logic modules 533 is individually coupled to bus controller 530 by a data bus. Bus controller 530 includes multiple data bus interfaces, one for each of data buses and the corresponding logic modules. In the illustrated example, bus controller 530 includes five data bus interfaces so that each bus 521-525 is coupled to its own bus interface of the bus controller 530. In various implementations, controller 530 may have more or fewer interfaces, and connect to more or fewer logic modules. Each logic module 533 may be an instance of the same logical operation.

To write to the registers of multiple logic modules 533, the bus controller 530 may send a broadcast write request by transmitting the same write request to each of the bus interfaces. The write requests include a value to be written to the registers of each of the logic modules 533 that are targeted by the write requests. In one embodiment, each of the logic module 533 are configured to transmit a write completion response to bus controller 530 subsequent to writing the value included in the write request. Bus controller 530 may then count the number of write completion responses received and compare that number to a number of the intended targets of the broadcast write request.

To read values from the registers of multiple logic modules 533, the bus controller 530 may send a broadcast read request by transmitting the same read request to each of the logic modules 533. The logic modules 533 that are targeted by the read request send a read response back to bus controller 530 over the data bus that connects the particular logic module 533 to the bus controller 530.

In one embodiment, each logic module 533 is configured with a broadcast address range. Each logic module 533 may determine whether the broadcast address included in the broadcast request is within the broadcast address range of the receiving logic module 533. If the broadcast address is within the broadcast address range of the receiving logic module 533, the receiving logic module 533 knows that it is being targeted.

Figure 6:
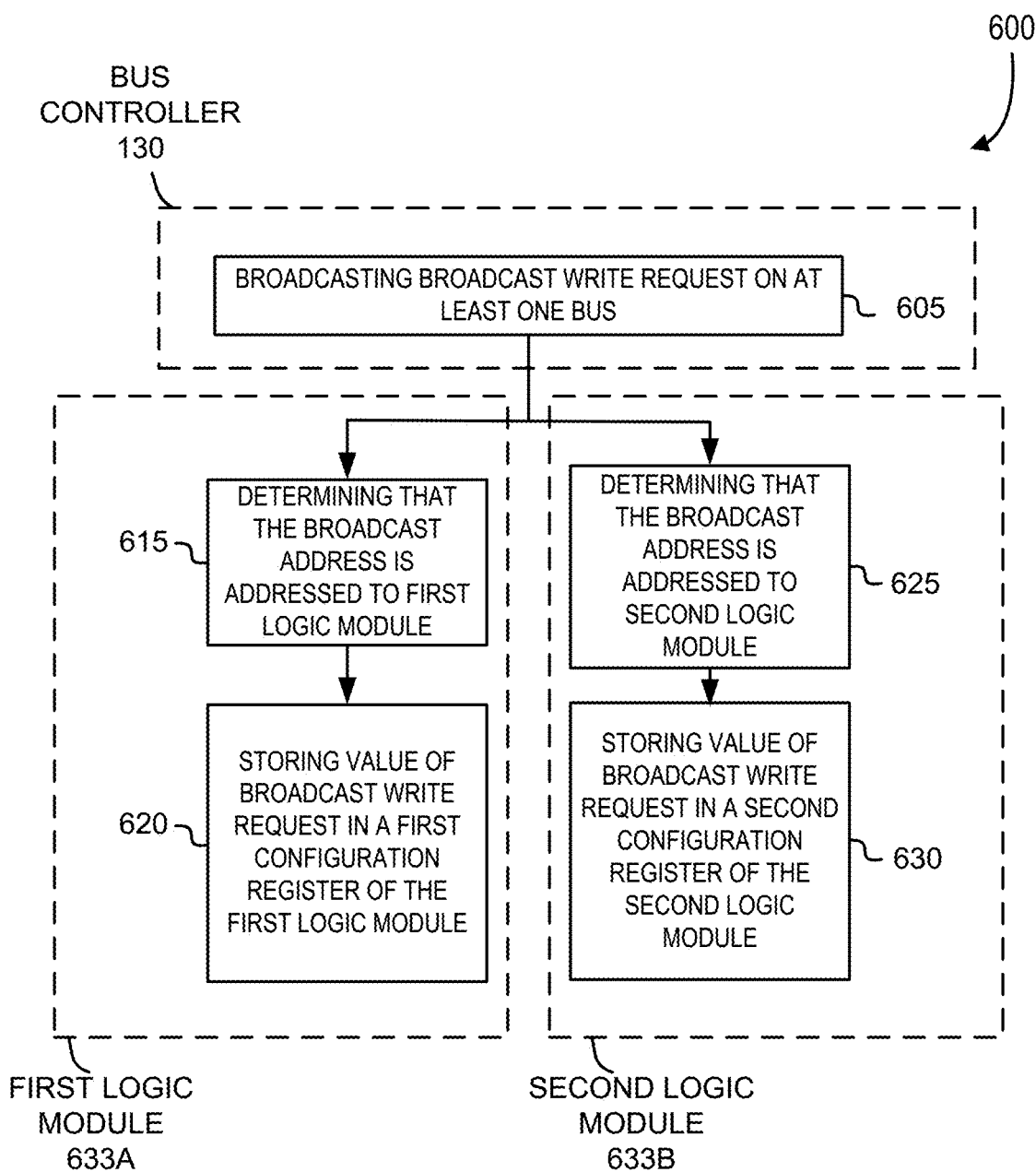
FIG. 6 provides an example of a process of broadcasting a broadcast write request.

FIG. 6 depicts an illustrative flow chart for a process 600 for writing one or more values to registers in a plurality of logic modules. The process 600 is illustrated as a logical flow diagram, each operation of which represents a sequence of operations that can be implemented in either hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

In process block 605, a broadcast write request is broadcasted on at least one bus. In the configuration of FIG. 1, the broadcast write request is broadcasted onto ring bus 120 by a ring bus controller 130. In the configuration of FIG. 5, the broadcast write request is broadcasted by transmitting a write request on each of the data busses that connect the logic modules 533 to bus controller 530. Returning to FIG. 6, the broadcast write request may include a broadcast address, a register address, and a value. In some implementations, the broadcast write request may include one address, where one component of the address indicates a broadcast address and another component indicates a register address. For example, in one implementation, the upper sixteen bits of the one address may represent the broadcast address and the remaining bits represent the register address.

In process block 615, a first logic module 633A (which may be similar to the logic module 333A/533A) may determine that the broadcast address is within a first address range of the first logic module 633A. In the configuration of FIG. 1, the first logic module 633A is connected to the ring bus. In process block 620 of FIG. 6, the value from the broadcast write request is stored in a first addressed register of the first logic module 633A. The first addressed register is specified by the register address included in the broadcast write request.

A second logic module 633B (which may be similar to the logic module 333B/533B) may receive the broadcast write request. In the configuration of FIG. 1, the second logic module 633B may receive the broadcast write request subsequent to the first logic module 633A receiving and processing the request. The second logic module 633B, at process block 625 of FIG. 6, may determine that the broadcast address is within a second address range of the second logic module 633B. The second logic module 633B is connected to the ring bus in the configuration of FIG. 1. In process block 630 of FIG. 6, the value from the broadcast write request is stored in a second addressed register of the second logic module 633B. The second addressed register is also specified by the register address included in the broadcast write request.

The process 600 illustrates the efficiency of a broadcast write request, in that one request can be used to write to registers in multiple logic modules. The process 600 takes advantage of designs that include multiple instances of the same logic module. The multiple instances of the logic module may typically include the same set of registers, and broadcast write requests allows those registers to be written with a minimum number of write requests.

Figure 7:
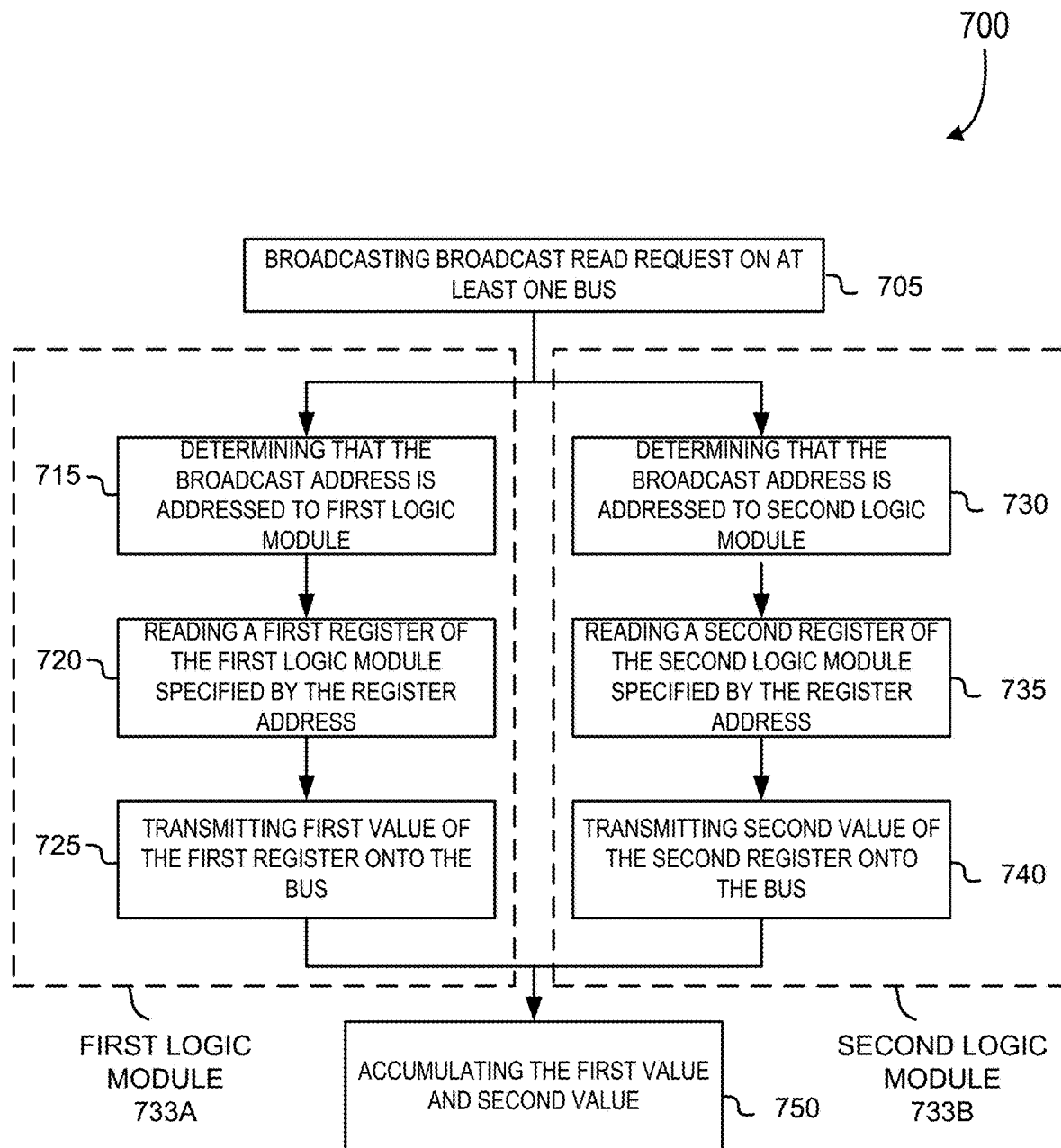
FIG. 7 provides an example of a process of broadcasting a broadcast read request.

FIG. 7 depicts an illustrative flow chart for a process 700 for reading one or more values to registers in a plurality of logic modules. The process 700 is illustrated as a logical flow diagram, each operation of which represents a sequence of operations that can be implemented in either hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

In process block 705, a broadcast read request may be broadcasted on at least one bus. In the configuration of FIG. 1, the broadcast read request is broadcasted onto ring bus 120 by a ring bus controller 130. In the configuration of FIG. 5, the broadcast read request is broadcasted by transmitting a read request on each of the data busses that connect the logic modules 533 to the bus controller 530. Returning to FIG. 7, in some implementations, the broadcast read request may include a broadcast address and a register address. In some implementations, the broadcast read request may include one address that represents a broadcast address and a register address.

In process block 715, a first logic module 733A (which may be similar to logic module 333A/533A) may determine that the broadcast address is within a first address range of the first logic module 733A. The first logic module 733A is connected to the ring bus, in the configuration illustrated in FIG. 1. In process block 720 of FIG. 7, a first register included in the first logic module 733A may be read by the first logic module 733A. In the configuration illustrated in FIG. 1, the first value (read from the first register of the first logic module 733A) may be transmitted onto the ring bus by the first logic module 733A, in process block 725 of FIG. 7. In the configuration illustrated in FIG. 5, the first value (read from the first register of the first logic module 733A) may be transmitted onto the data bus coupled between the first logic module 733A and bus controller 530.

In process block 730 of FIG. 7, a second logic module 733B (which may be similar to the logic module 333B/533B) may determine that the broadcast address is within a second address range of the second logic module 733B. The second logic module 733B is connected to the ring bus, in the configuration illustrated in FIG. 1. In process block 735 of FIG. 7, a second register included in the second logic module 733B may be read by the second logic module 733B. In the configuration illustrated in FIG. 1, the second value (read from the second register of the second logic module 733B) may be transmitted onto the ring bus by the second logic module 733B, in process block 740 of FIG. 7. In the configuration illustrated in FIG. 5, the second value (read from the second register of the second logic module 733B) may be transmitted onto the data bus coupled between the second logic module 733B and bus controller 530.

In process block 750 of FIG. 7, the first value read from the first logic module 733A and the second value read from the second logic module 733B may be accumulated by the bus controller (e.g. 130/530). For example, the bus controller may append the first value and the second value into one accumulated response. As another example, the bus controller may be configured to sum the first and second value, and return the sum in an accumulated response. The bus controller may send an accumulated response that includes the first value and the second value to one or more processors (e.g. host CPU 290). In one embodiment, the accumulated response is sent in a data burst to the one or more processors.

Process 700 illustrates the potential efficiency of a broadcast read request. Specifying a single register address in a broadcast read request may effect reading the specified register from multiple logic modules when the logic module includes a register with the register address. Additionally, since the values read from the specified configuration register may be accumulated by the bus controller, an accumulated response can be sent back to one or more processors all at once, for example in a data burst. Consequently, a processor (e.g. host CPU 290) can send a broadcast read request to controller once, and after the bus controller accumulates all the requested read values, receive the requested read values in a single data burst. Therefore, a large portion of the processing responsibility to facilitate the reads of multiple logic modules can be shifted from the host CPU 290 to a bus controller.

Figure 8:
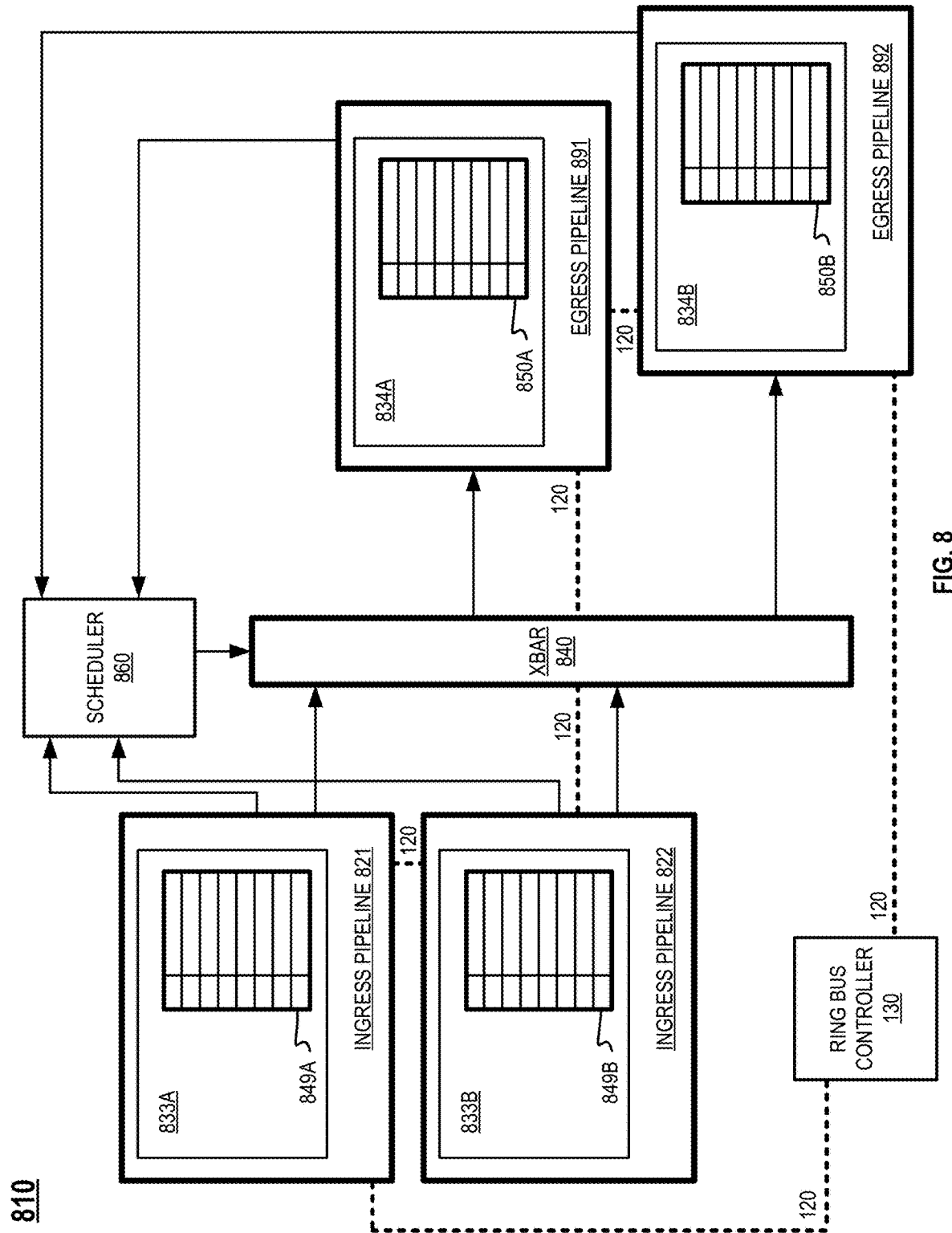
FIG. 8 illustrates a top-level block diagram of a portion of an example network controller implemented as an ASIC.

FIG. 8 illustrates an example of a top-level block diagram of a portion of a controller 810 implemented as an ASIC. In FIG. 8, controller 810 may be a network controller for routing network data. A network controller is one example context where the embodiments of the disclosure may be implemented. Example controller 810 includes ingress pipelines 821 and 822, scheduler 860, crossbar 840, and egress pipelines 891 and 892. Controller 810 also includes ring bus controller 130 for managing the ring bus 120. Scheduler 860 and crossbar 840 move packets of network data from the ingress pipelines 821 and 822 to egress pipeline 891 and 892. Although FIG. 8 illustrates only two ingress pipelines and two egress pipelines, it is understood that a network controller may have more pipelines (e.g. eight pipelines) in some implementations. Furthermore, the ring bus 120 is illustrated in FIG. 8 for the purposes of showing which logic modules are coupled to the ring bus 120 and does not reflect how the ring bus 120 may actually be routed to connect the logic modules and ring bus controller 130.

Network controller 810 may include an ethernet port array (not illustrated) to send and receive network data. Ingress pipelines 821 and 822 may receive network data from the ethernet port for processing. Ingress pipeline 821 includes a logic module 833A coupled to the ring bus 120 and ingress pipeline 822 includes a logic module 833B coupled to ring bus 120, in FIG. 8. Logic modules 833A and 833B (collectively referred to as logic modules 833) may be instances of the same logical operation. Logic module 833A includes a plurality of registers 849A and logic module 833B includes a plurality of registers 849B (the registers 849A, 849B are referred to collectively as registers 849). The plurality of registers 849 may include entries in a RAM. The RAM may store routing tables, in some embodiments.

Egress pipelines 891 and 892 may receive network data from the crossbar 840 for transmitting to the network. Egress pipeline 891 includes a logic module 834A coupled to the ring bus 120 and egress pipeline 892 includes a logic module 834B coupled to the ring bus 120, in FIG. 8. Logic modules 834A and 834B (collectively referred to as logic modules 834) may be instances of the same logical operation. Logic module 834A includes a plurality of registers 850A and logic module 834B includes a plurality of registers 850B (the registers 850A, 850B are collectively referred to as registers 850). The plurality of registers 850 may include entries in a RAM. The RAM may include routing tables, in some embodiments.

In the illustrated example, logic modules 833 and 834 are coupled to the ring bus 120. In one embodiment, ring bus controller 130 transmits a broadcast write request onto the ring bus 120, where the broadcast write request targets logic modules 833. Thus, with a single broadcast write request on the ring bus 120, the ring bus controller 130 is able to update multiple registers in logic modules of multiple ingress pipelines. In another example, ring bus controller 130 transmits a broadcast write request onto the ring bus 120, where the broadcast write request targets logic modules 834. Thus, with a single broadcast write request on the ring bus 120, the ring bus controller is able to update multiple registers in multiple logic modules of egress pipelines. In yet another example, ring bus controller 130 transmits a broadcast write request onto the ring bus 120, where the broadcast write request targets logic modules 833 and 834. Thus, with a single broadcast write request on the ring bus 120, the ring bus controller is able to update multiple registers in multiple logic modules of both the ingress and egress pipelines.

Ring bus controller 130 may also transmit a broadcast read request onto the ring bus 120, where the broadcast read request targets logic modules 833. Thus, with a single broadcast read request on the ring bus 120, the ring bus controller 130 is able to read multiple registers in logic modules of multiple ingress pipelines. In another example, ring bus controller 130 transmits a broadcast read request onto the ring bus 120, where the broadcast read request targets logic modules 834. Thus, with a single broadcast read request on the ring bus 120, the ring bus controller is able to read multiple registers in multiple logic modules of egress pipelines. In yet another example, ring bus controller 130 transmits a broadcast read request onto the ring bus 120, where the broadcast read request targets logic modules 833 and 834. Thus, with a single broadcast read request on the ring bus 120, the ring bus controller is able to read multiple registers in multiple logic modules of both the ingress and egress pipelines.

Figure 9:
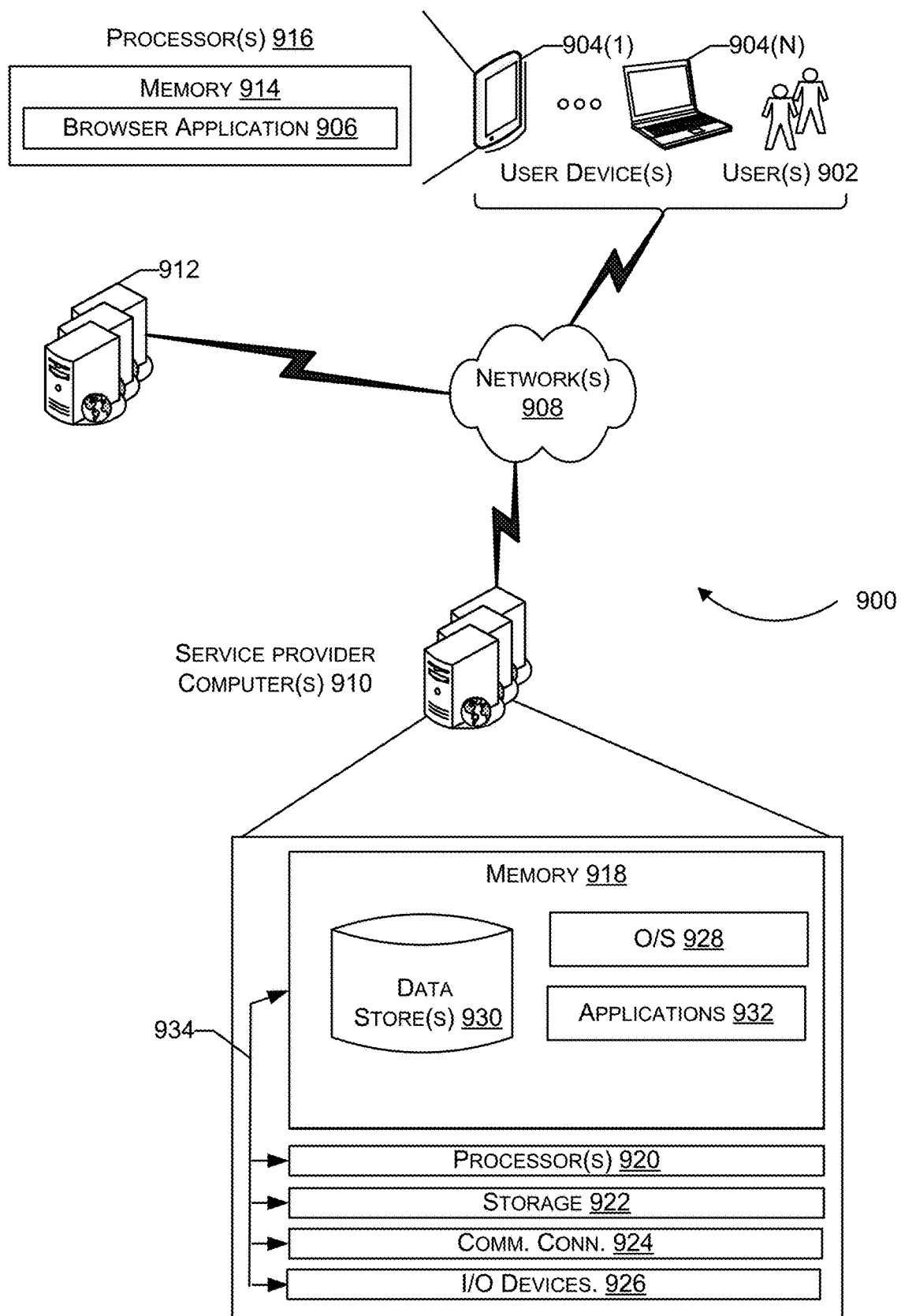
FIG. 9 illustrates an example architecture for features and systems described herein that includes one or more service provider computers and/or a user device connected via one or more networks, according to some embodiments.

FIG. 9 illustrates an example architecture for features and systems described herein that includes one or more service provider computers and/or a user device connected via one or more networks. The integrated circuits, systems, and methods discussed in FIGS. 1-8 may be implemented in one or more of the computing devices described in FIG. 9. For example the embodiment of FIGS. 1-8 may be implemented in service provider computer(s) 910. In the illustrated architecture 900, one or more users 902 may use user computing devices 904(1)-(N) to access an application 906 (e.g., a web browser or mobile device application), via one or more networks 908. In some aspects, the application 906 may be hosted, managed, and/or provided by a computing resources service or service provider. One or more service provider computers 910 may provide a native application that is configured to run on the user devices 904, which user(s) 902 may interact with. The service provider computer(s) 910 may, in some examples, provide computing resources such as, but not limited to, client entities, low latency data storage, durable data storage, data access, management, virtualization, cloud-based software solutions, electronic content performance management, and so on. The service provider computer(s) 910 may also be operable to provide web hosting, computer application development and/or implementation platforms, combinations of the foregoing or the like to the user(s) 902. The service provider computer(s) 910, in some examples, may communicate with one or more third party computers 912.

In some examples, network(s) 908 may include any one or a combination of many different types of networks, such as cable networks, the Internet, wireless networks, cellular networks and other private and/or public networks. While the illustrated example represents the user(s) 902 accessing an application 906 over the network(s) 908, the described techniques may equally apply in instances where the user(s) 902 interact with the service provider computer(s) 910 via user device(s) 904 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, the application 906 may allow the user(s) 902 to interact with the service provider computer(s) 910 to, for example, access web content (e.g., web pages, music, video, etc.). The service provider computer(s) 910, which may be arranged in a cluster of servers or as a server farm, may host the application 906 and/or cloud-based software services. Other server architectures may also be used to host the application 906. The application 906 may be capable of handling requests from many users 902 and serving, in response, various item web pages. The application 906 can provide any type of website that supports user interaction, including social networking sites, online retailers, informational sites, blog sites, search engine sites, news and entertainment sites, and so forth. As discussed above, the described techniques can similarly be implemented outside of the application 906, such as with other applications running on the user device(s) 904.

The user device(s) 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 904 may be in communication with the service provider computer(s) 910 via the network(s) 908, or via other network connections. Additionally, the user device(s) 904 may be part of the distributed system managed by, controlled by, or otherwise part of the service provider computer(s) 910 (e.g., a console device integrated with the service provider computers 910).

In one illustrative configuration, a user device(s) 904 may include at least one memory 914 and one or more processing units (or processor(s) 916). The processor(s) 916 may be implemented in hardware, computer-executable instructions, firmware, or combinations thereof.

Computer-executable instruction or firmware implementations of the processor(s) 916 may include computer-executable or machine-executable instructions written in any suitable programming language to perform the various functions described. The user device(s) 904 may also include geo-location devices (e.g., a global positioning system (GPS) device or the like) for providing and/or recording geographic location information associated with the user device(s) 904.

The memory 914 may store program instructions that are loadable and executable on the processor(s) 916, as well as data generated during the execution of these programs. Depending on the configuration and type of the user device(s) 904, the memory 914 may be volatile (such as random access memory (RAM)) and/or non-volatile (such as read-only memory (ROM), flash memory, etc.). The user device(s) 904 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, the memory 914 may include multiple different types of memory, such as static random access memory (SRAM), dynamic random access memory (DRAM), or ROM.

Turning to the contents of the memory 914 in more detail, the memory 914 may include an operating system and one or more application programs or services for implementing the features disclosed herein including at least a user provided input element or electronic service web page, such as via a browser application 906 or dedicated applications (e.g., smart phone applications, tablet applications, etc.). The browser application 906 may be configured to receive, store and/or display a website or other interface for interacting with the service provider computer(s) 910. Additionally, the memory 914 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 904.

In some aspects, the service provider computer(s) 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 910 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 910 may be in communication with the user device(s) 904 and/or other service providers via the network(s) 908, or via other network connections. The service provider computer(s) 910 may include one or more servers, perhaps arranged in a cluster, as a server farm, or as individual servers not associated with one another. These servers may be configured as part of an integrated, distributed computing environment.

In one illustrative configuration, the service provider computer(s) 910 may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the service provider computer(s) 910, the memory 918 may be volatile (such as RAM) and/or non-volatile (such as ROM, flash memory, etc.). The service provider computer(s) 910 or servers may also include additional storage 922, which may include removable storage and/or non-removable storage. The additional storage 922 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918, the additional storage 922, both removable and non-removable are all examples of computer-readable storage media. For example, computer-readable storage media may include volatile or non-volatile, removable or non-removable media implemented in any method or technology for storage of information such as computer-readable instructions, data structures, program modules, or other data. The memory 918 and the additional storage 922 are all examples of computer storage media. Additional types of computer storage media that may be present in the service provider computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 910. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 910 may also contain communications connection(s) 924 that allow the service provider computer(s) 910 to communicate with a stored database, another computing device or server, user terminals and/or other devices on the network(s) 908. The service provider computer(s) 910 may also include I/O device(s) 926, such as a keyboard, a mouse, a pen, a voice input device, a touch input device, a display, speakers, a printer, and the like. The communication connection(s) 924 and I/O device(s) 926, along with the storage 922, may be described as peripheral devices.

The memory 918 may include an operating system 928, one or more data stores 930 and/or one or more application programs 932 or services for implementing the features disclosed herein.

The service provider computer(s) 910 may also include one or more communication channels 934. A communication channel 934 may provide a medium over which the various components of the service provider computer 910 can communicate. The communication channel or channels 934 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

Figure 10:
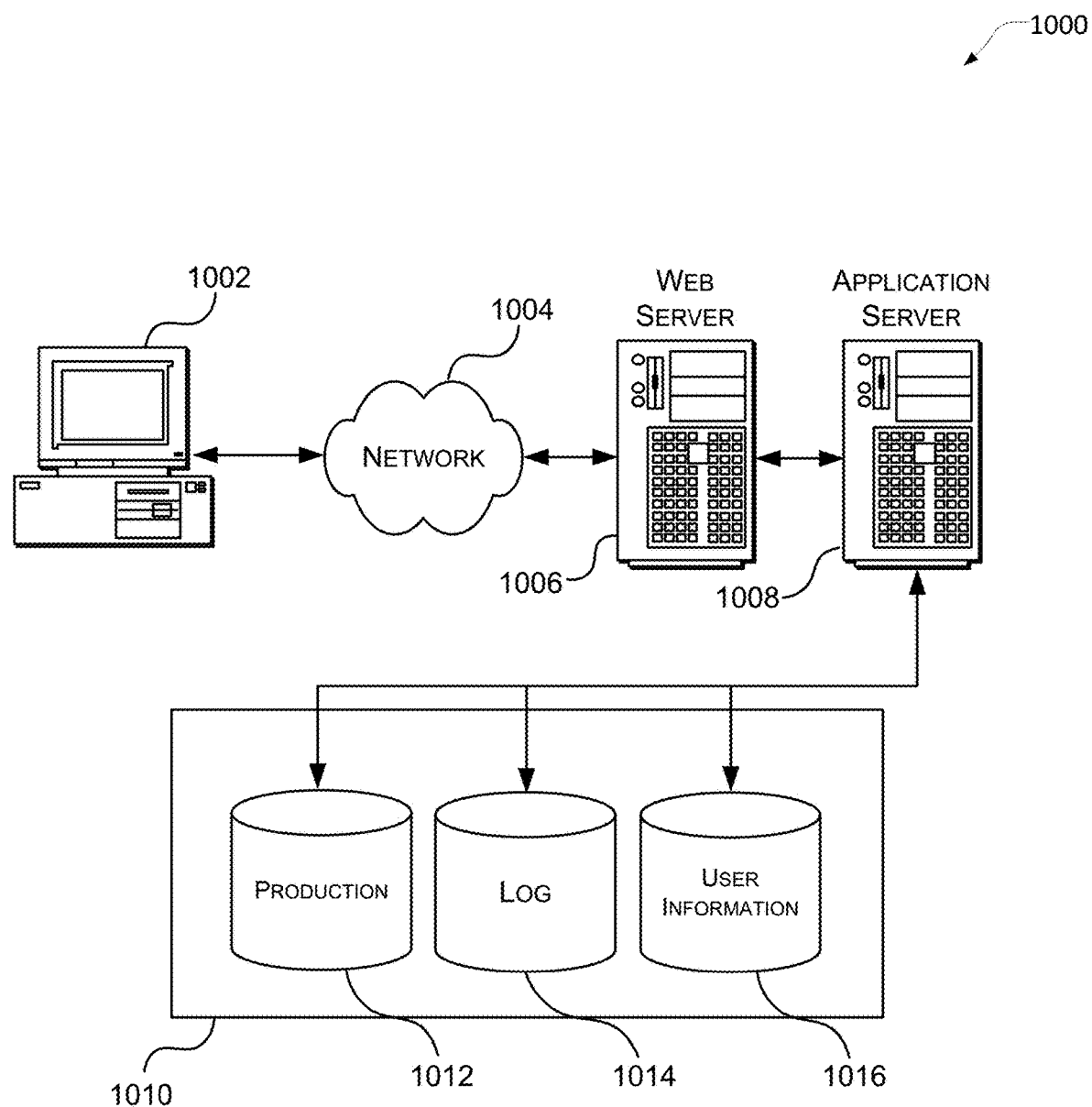
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
a bus circuit;
logic module circuits sequentially coupled to the bus circuit, the logic module circuits each including a respective plurality of registers operable to perform a same function within each respective logic module circuit; and
a bus controller circuit coupled to the bus circuit;
wherein the integrated circuit device is operable to:
receive, at the bus controller circuit, a read request, the read request including a broadcast indicator and an address;
transmit, by the bus controller circuit, the read request to a first logic module circuit in a sequential order of the logic module circuits;
determine, by the first logic module circuit, to accept the read request, wherein the first logic module circuit determines to accept the read request based on the broadcast indicator;
read, by the first logic module circuit, a first value from a first register identified by the address;
transmit, by the first logic module circuit, the read request and the first value to a next logic module circuit in the sequential order of the logic module circuits;
receive, at a last logic module circuit in the sequential order of the logic module circuits, the read request and the first value;
determine, by the last logic module circuit, to accept the read request, wherein the last logic module circuit determines to accept the read request based on the broadcast indicator;
read, by the last logic module circuit, a second value from a second register identified by the address;
transmit, by the last logic module circuit, the read request, the first value, and the second value to the bus controller circuit;
accumulate, by the bus controller circuit, the first value and the second value into an accumulated value; and
output, by the bus controller circuit, the accumulated value as a response to the read request.

2. The integrated circuit device of claim 1, wherein each of the logic module circuits includes a different address range corresponding to the respective plurality of registers of each logic module circuit.

3. The integrated circuit device of claim 1, wherein each of the logic module circuits includes a broadcast address range corresponding to the respective plurality of registers of each logic module circuit.

4. The integrated circuit device of claim 1, wherein the read request includes a counter, and wherein each of the logic module circuits increments or decrements the counter upon accepting the read request.

5. The integrated circuit device of claim 4, wherein the integrated circuit device is further operable to:

determine, by the bus controller circuit, whether the counter matches an expected value when the bus controller circuit receives the read request from the last logic module circuit.

6. The integrated circuit device of claim 1, wherein the respective plurality of registers of each logic module circuit include configuration registers, statistics registers, or entries in a Random-Access-Memory (RAM).

7. An integrated circuit device comprising:
a bus circuit;
logic module circuits coupled to the bus circuit, wherein each logic module circuit is operable to perform a same logical operation on different streams of data, and wherein each logic module circuit includes a respective plurality of registers; and
a bus controller circuit coupled to the bus circuit;
wherein the integrated circuit device is operable to:
  receive, at the bus controller circuit, a read request, the read request including a broadcast indicator and an address;
  transmit, by the bus controller circuit, the read request onto the bus circuit for receipt by each of the logic module circuits;
  determine, by each of the logic module circuits, to accept the read request, wherein each logic module circuit determines to accept the read request based on the broadcast indicator;
  read, by each of the logic module circuits, a value from a register identified by the address;
  transmit, by each of the logic module circuits, the value onto the bus circuit for receipt by the bus controller circuit, wherein at least one of the logic module circuits is additionally operable to transmit the value to a different logic module circuit of the logic module circuits;
  accumulate, at the bus controller circuit, each value read by each of the logic module circuits; and
  output, by the bus controller circuit, an accumulated value as a response to the read request.

8. The integrated circuit device of claim 7, wherein a set of bits of the address comprises the broadcast indicator.

9. The integrated circuit device of claim 8, wherein the integrated circuit device is further operable to:
  determine, by each of the logic module circuits, that the address does not correspond to a register from the respective plurality of registers of each logic module circuit.

10. The integrated circuit device of claim 8, wherein each logic module circuit determines to accept the read request based on the address being within a broadcast address range of the logic module circuit.

11. The integrated circuit device of claim 7, wherein the read request includes the broadcast indicator in a command field.

12. The integrated circuit device of claim 11, wherein each logic module circuit determines that the address is not within a respective address range associated with the logic module circuit.

13. The integrated circuit device of claim 7, wherein accumulating includes appending each value into the accumulated value.

14. The integrated circuit device of claim 7, wherein accumulating includes summing each value into the accumulated value.

15. The integrated circuit device of claim 7, wherein accumulating includes performing a logical operation on each value and outputting a result into the accumulated value.

16. A computer-implemented method, the method comprising:
  receiving, at a bus controller circuit of an integrated circuit device, a read request, the read request including a broadcast indicator and an address;
  transmitting, by the bus controller circuit, the read request onto a bus circuit of the integrated circuit device for receipt by logic module circuits coupled to the bus circuit, wherein each of the logic module circuits receives the read request, wherein each logic module circuit is operable to perform a same logical operation on different streams of data, and wherein each logic module circuit includes a respective plurality of registers;
  determining, by each of the logic module circuits, to accept the read request, wherein each logic module circuit determines to accept the read request based on the broadcast indicator;
  reading, by each of the logic module circuits, a value from a register identified by the address;
  transmitting, by each of the logic module circuits, the value onto the bus circuit for receipt by the bus controller circuit, wherein at least one of the logic module circuits is additionally operable to transmit the value to a different logic module circuit of the logic module circuits;
  accumulating, at the bus controller circuit, each value read by each of the logic module circuits; and
  outputting, by the bus controller circuit, an accumulated value as a response to the read request.

17. The computer-implemented method of claim 16, wherein a set of bits of the address comprises the broadcast indicator.

18. The computer-implemented method of claim 17, further comprising:
  determining, by each of the logic module circuits, that the address does not correspond to a register from the respective plurality of registers of each logic module circuit.

19. The computer-implemented method of claim 16, wherein the read request includes the broadcast indicator in a command field.

20. The computer-implemented method of claim 19, wherein each logic module circuit determines that the address is not within a respective address range associated with the logic module circuit.

* * * * *